United States Patent
Kopp et al.

(10) Patent No.: US 10,159,984 B2
(45) Date of Patent: Dec. 25, 2018

(54) METHOD FOR MAKING RECESSES IN A ROLLING ROLLER

(71) Applicant: KHD Humboldt Wedag GmbH, Cologne (DE)

(72) Inventors: Guenther Kopp, Cologne (DE); Dieter Brendler, Bergisch Gladbach (DE)

(73) Assignee: KHD HUMBOLDT WEDAG GMBH, Cologne (DE)

( * ) Notice: Subject to any disclaimer, the term of this patent is extended or adjusted under 35 U.S.C. 154(b) by 386 days.

(21) Appl. No.: 15/106,522

(22) PCT Filed: Dec. 9, 2014

(86) PCT No.: PCT/EP2014/076966
§ 371 (c)(1),
(2) Date: Dec. 21, 2016

(87) PCT Pub. No.: WO2015/091086
PCT Pub. Date: Jun. 25, 2015

(65) Prior Publication Data
US 2017/0106373 A1 Apr. 20, 2017

(30) Foreign Application Priority Data
Dec. 20, 2013 (DE) .................. 10 2013 021 764
Feb. 18, 2014 (DE) .................. 10 2014 002 366

(51) Int. Cl.
*B02C 4/30* (2006.01)
*B23P 6/00* (2006.01)
*B23K 31/02* (2006.01)

(52) U.S. Cl.
CPC .............. *B02C 4/30* (2013.01); *B02C 4/305* (2013.01); *B23K 31/02* (2013.01); *B23P 6/00* (2013.01); *Y10T 29/4956* (2015.01); *Y10T 29/49561* (2015.01)

(58) Field of Classification Search
CPC ........... B02C 4/30; B02C 4/305; B23K 31/02; B23K 31/10; Y10T 29/49545; Y10T 29/4956; Y10T 29/49561; Y10T 29/49565; Y10T 29/49732; Y10T 29/49734; Y10T 29/49737; Y10T 29/49746; C21D 9/36; C21D 2251/04; C21D 2221/00

USPC .............. 427/142, 375, 376.6, 376.7, 376.8
See application file for complete search history.

(56) References Cited

U.S. PATENT DOCUMENTS

| | | | |
|---|---|---|---|
| 4,848,683 A * | 7/1989 | Kawatsu | B02C 2/005 241/294 |
| 5,000,392 A | 3/1991 | Kaestingschaefer et al. | |
| 5,269,477 A * | 12/1993 | Buchholtz | B02C 4/305 241/293 |
| 5,312,056 A | 5/1994 | Kaestingschaefer et al. | |
| 7,048,081 B2 * | 5/2006 | Smith | C04B 35/52 175/426 |
| 8,241,761 B2 * | 8/2012 | Garber | B02C 1/10 29/898.12 |
| 8,308,096 B2 * | 11/2012 | Mirchandani | B22F 7/062 241/235 |
| 2013/0248630 A1 | 9/2013 | Martens et al. | |
| 2013/0299618 A1 * | 11/2013 | Sharman | B02C 1/10 241/300 |

FOREIGN PATENT DOCUMENTS

| | | |
|---|---|---|
| DE | 3915320 | 11/1990 |
| DE | 102010061309 | 5/2012 |
| EP | 0563564 | 10/1993 |

OTHER PUBLICATIONS

International Search Report, dated Feb. 5, 2015, priority document.

* cited by examiner

*Primary Examiner* — Jason L Vaughan
(74) *Attorney, Agent, or Firm* — Greer, Burns & Crain, Ltd.

(57) ABSTRACT

A method for making recesses in the surface of a roller for a rolling press. A thermal treatment is applied to a cylindrical roller surface by heating the surface in a region of the desired recesses until the material properties of the roller surface change permanently, i.e., even after cooling, with respect to the hardness of the roller material. The thermally treated regions produce a softer material in those regions than in the surrounding surface of the roller. By virture of a first start-up of the rolling press with abrasive material to be comminuted, the desired profiling is formed spontaneously due to a wearing down of the soft regions to form the desired recesses. The thermal treatment represent a particularly simple and cost-effective method for profiling rolling rollers, and in particular, rolling rollers which have already become worn, which that thereby be readily refurbished.

14 Claims, No Drawings

METHOD FOR MAKING RECESSES IN A ROLLING ROLLER

CROSS-REFERENCES TO RELATED APPLICATIONS

This application claims the benefit of the German patent application No. 10 2013 021 764.4 filed on Dec. 20, 2013, and of the German patent application No. 10 2014 002 366.4 filed on Feb. 18, 2014, the entire disclosures of which are incorporated herein by way of reference.

BACKGROUND OF THE INVENTION

The invention relates to a method for introducing recesses into the surface of a rolling roller for a rolling press.

In order to comminute granular and brittle material to be ground, it is known practice, instead—as conventional—of using shear stress, to comminute the material to be ground economically in terms of energy just by using high pressure in a roller gap. This manner of comminuting has, in addition to the favorable use in terms of energy, the advantage of an increased service life of the rollers used for generating the pressure in the roller gap.

However, in the case of comminuting rock and very hard and abrasive clinker, a predetermined limit is placed on the service life of a roller of a rolling press, this limit resulting from the high degree of abrasion by the material to be comminuted. In the case of comminution in the roller gap, it is additionally important that the material to be ground passes through the roller gap in a uniform and controlled manner For reduced abrasion and for improved and uniform entry of the material to be ground into the roller gap of the rolling press, it is now common practice to profile the counterrotating rollers of the rolling press. In the simplest case, this profiling comprises longitudinal grooves extending in the axial direction on the surface of the roller, compacted material to be ground collecting in these grooves so as to form an autogenous wear protection layer, which results in more uniform entry of material, even when the material to be ground has a broad grain size distribution or a grain size distribution that varies on average over time.

The structure of a roller for a rolling press typically comprises a main roller body with shafts arranged thereon. No particular requirements in terms of material properties are imposed on the main body. A bandage having the surface condition mentioned at the beginning is then shrunk onto this main body or fastened thereto by other means known to a person skilled in the art. This bandage is a substantially cylindrical hollow body, the inner side of which is compatible in terms of size with the main roller body, the outer side of the bandage bearing profiling that is usually applied subsequently. The profiling is generally introduced either by machining, or deposition welding is used to apply weld beads to the surface, with the result that the grooves that produce the profile of the bandage arise between the weld beads. The choice of processing operation for profiling depends essentially on the material properties of the surface of the rolling roller or of the bandage for the rolling roller. Particularly hard materials, such as carbon steels, are generally temperature-sensitive. Cast steel, such as ADI (austempered ductile iron), the microstructure of which changes only with high levels of stress and which only then becomes very hard as a result, can change, even at temperatures around 400° C., to a phase which no longer has the desired material properties and therefore generally becomes very soft and susceptible to wear. Furthermore, cast steels are difficult to weld, and so a weld bead can be applied to the surface only with a great deal of experience, if at all. In the case of machining, depending on the material properties, the material can shear or break off at the surface, or, during machining, the material can heat up undesirably in the regions that are not to be removed, with the result that, during use, the material is subject to high wear at the location where it is not intended to be removed.

SUMMARY OF THE INVENTION

It is therefore an object of the invention to propose a method for introducing recesses into a rolling roller which is easy to carry out.

The object underlying the invention is achieved by thermal treatment of a cylindrical roller surface, wherein the roller surface is heated in the region of the desired recesses until the material properties of the roller surface change permanently, i.e., even after cooling, with respect to the hardness of the roller material.

DETAILED DESCRIPTION OF THE PREFERRED EMBODIMENTS

Instead of removing the surface material in order to introduce profiling, applying weld beads thereto or shaping it in some other way, the invention proposes thermally treating the surface of the rolling roller to be processed, specifically at those locations at which the material is subsequently intended to fail. The material of the surface is not removed, but rather remains in situ, such that this first processing step does not yet bring the rolling roller into a viable state. It is only the initial use of the rolling roller in a high-pressure rolling press using high pressure and abrasive material that causes the material to suddenly and uniformly break off or wear down at the locations at which recesses are intended to be present in the surface of the rolling roller. Provision is thus made for the thermal treatment of the surface material of the rolling roller to change the microstructure and thus to take the otherwise desired hardness and abrasion resistance away from the material of the surface. In the case of cast steels, a temperature of much lower than 1000° C. suffices for thermal treatment, and so a welding torch passing by heats the material in a striped manner and introduces a change in microstructure down to a depth of up to 10 mm into the material.

When the rolling roller is put into operation for the first time, the rolling roller being intended to have profiling in order to improve the entry behavior and to form an autogenous wear layer, it is necessary to put the rolling roller into operation with the poorer entry behavior. In this case, the material feed should be monitored so that a bed of fresh material does not form at the roller gap of the high-pressure rolling press, under which gap the rolling rollers rotate and do not draw in material.

In order to carry out the thermal treatment, provision can be made according to the invention for a laser, welding torch, induction heating or friction to be used. In all cases, the surface material heats to such an extent that the hard microstructure, or microstructure that becomes hard by stress, becomes soft and sensitive to abrasion.

In order to carry out the method, provision can be made for the rolling roller to be installed in the high-pressure rolling press in an untreated state and with a cylindrical, smooth surface, and for the material layers of the rolling roller, which are changed after thermal treatment, to be worn down by it being put into operation for the first time. The proposal is thus made to thermally treat the untreated rolling roller in the high-pressure rolling press and to give the rolling roller, which has a virtually unchanged appearance after thermal treatment, desired profiling by targeted wear when it is put into operation for the first time.

For an advantageous effect, profiles with recesses transverse to the direction of rotation, i.e., substantially axially parallel, should be introduced. The thermal treatment of the rolling roller takes place in the form of the heating of axially parallel stripes, polygons arranged in a regular grid, or circles. In order to heat stripes, it is not necessary to heat the entire stripe uniformly, but rather provision can be made to cause a point heat source, such as a welding torch, laser or induction heater, to slowly form a stripe on the surface by passing by. In the case of the desired formation of polygons or circular areas, the area can be filled by the heat source in a similar manner to drawing with a pen.

The method according to the invention has particular advantages for reconditioning already-worn rolling rollers for a high-pressure rolling press for comminuting brittle material to be ground and in the use of particularly difficult surface materials as the material for a rolling roller, which can be provided with deposition welds only with high outlay on apparatus or with a high degree of knowledge. Worn rollers with an irregular or not perfectly cylindrical surface do not need to be worn down for reworking, but rather the irregular, optionally even slightly bumpy surface can be treated directly, wherein the heat source, welding torch, laser beam or induction heater only has to be brought into the vicinity of the surface rather than needing to be placed directly on the surface, like a cutting tool.

In one particular embodiment of the invention, the thermal treatment of the surface is achieved by a deposition weld, wherein the deposition weld, unlike known application welds with a very hard material, comprises a material which is much softer than the surface of the rolling roller to be treated. It is only in initial operation that the soft material would abrade rapidly and the changed rolling roller surface under the deposition weld would likewise very soon form recesses. Surprisingly, it has been found that, with this type of thermal treatment, crack formation at the edges of the recesses is absent.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A method for introducing desired recesses into a surface of a rolling roller for a rolling press comprising:
    thermally treating limited portions of a cylindrical roller surface, wherein the roller surface is heated only in a region of the desired recesses until the material properties of the roller surface change permanently, with respect to the hardness of the roller material,
    applying a deposition weld only in the region of the desired recesses, said deposition weld being made of a material which is softer than a material of the surface of the rolling roller.

2. The method as claimed in claim 1, further including:
    wearing down thermally treated regions of the roller surface by way of abrasive material which is comminuted under high-pressure treatment on the roller surface.

3. The method as claimed in claim 1, wherein the step of thermally treating is performed by one of heating using a laser, welding torch, induction heating or friction.

4. The method as claimed in claim 1, wherein the limited portions extend transversely of a direction of rotation of the roller surface.

5. The method as claimed in claim 1, wherein the thermal treatment of the rolling roller in undertaken in a form of one of axially parallel stripes, polygons arranged in a regular grid, or circles.

6. A method of introducing desired recesses into a surface of a rolling roller for a high-pressure rolling press for comminuting brittle material to be ground, comprising:
    installing the rolling roller in the high-pressure rolling press in an untreated state and with a cylindrical, smooth surface,
    thereafter, thermally treating limited portions of the cylindrical roller surface, by heating the roller surface only in a region of the desired recesses until the material properties of the roller surface change permanently, with respect to the hardness of the roller material,
    applying a deposition weld only in the region of the desired recesses, said deposition weld being made of a material which is softer than a material of the surface of the rolling roller,
    wearing down the deposition weld and roller surface regions of the desired recesses of the rolling roller which are changed after thermal treatment, by putting the rolling roller into operation to comminute brittle material without first removing the regions of the surface that have been thermally treated.

7. The method as claimed in claim 6, wherein the thermal treatment of the rolling roller in undertaken in a form of one of axially parallel stripes, polygons arranged in a regular grid, or circles.

8. The method as claimed in claim 6, wherein the limited portions extend transversely of a direction of rotation of the roller surface.

9. The method as claimed in claim 6, wherein the step of thermally treating is performed by one of heating using a laser, welding torch, induction heating or friction.

10. A method for refurbishing a worn rolling roller of a roller press by introducing desired recesses into a surface of the rolling roller comprising:
    thermally treating limited portions of the roller surface of the worn rolling roller by heating the roller surface only in a region of the desired recesses until the material properties of the roller surface change permanently, with respect to the hardness of the roller material,
    applying a deposition weld only in the region of the desired recesses, said deposition weld being made of a material which is softer than a material of the surface of the rolling roller,
    wearing down the deposition weld and roller surface regions of the desired recesses of the rolling roller which are changed after thermal treatment, by putting the rolling roller into operation to comminute brittle material without first removing the regions of the surface that have been thermally treated.

11. The method as claimed in claim 10, further including maintaining the worn rolling roller in the rolling press during the steps of thermally treating and applying a deposition weld.

12. The method as claimed in claim 10, wherein the limited portions extend transversely of a direction of rotation of the roller surface.

13. The method as claimed in claim 10, wherein the thermal treatment of the rolling roller in undertaken in a form of one of axially parallel stripes, polygons arranged in a regular grid, or circles.

14. The method as claimed in claim 10, wherein the step of thermally treating is performed by one of heating using a laser, welding torch, induction heating or friction.

* * * * *